(12) United States Patent
Lee et al.

(10) Patent No.: US 10,215,903 B2
(45) Date of Patent: Feb. 26, 2019

(54) METHOD FOR PREPARING POLARIZING PLATE LOCALLY HAVING DEPOLARIZATION REGION, AND POLARIZING PLATE PREPARED BY USING SAME

(71) Applicant: LG CHEM, LTD., Seoul (KR)

(72) Inventors: Byung Sun Lee, Daejeon (KR); Ji Young Kim, Daejeon (KR); Sung Hyun Nam, Daejeon (KR); Kyun Il Rah, Daejeon (KR)

(73) Assignee: LG CHEM, LTD., Seoul (KR)

( * ) Notice: Subject to any disclaimer, the term of this patent is extended or adjusted under 35 U.S.C. 154(b) by 69 days.

(21) Appl. No.: 15/105,938

(22) PCT Filed: Jun. 24, 2015

(86) PCT No.: PCT/KR2015/006420
§ 371 (c)(1),
(2) Date: Jun. 17, 2016

(87) PCT Pub. No.: WO2016/003105
PCT Pub. Date: Jan. 7, 2016

(65) Prior Publication Data
US 2017/0131448 A1    May 11, 2017

(30) Foreign Application Priority Data

Jun. 30, 2014 (KR) .................. 10-2014-0080490
Sep. 26, 2014 (KR) .................. 10-2014-0129209

(51) Int. Cl.
*G02B 5/30* (2006.01)
*B32B 27/30* (2006.01)
(Continued)

(52) U.S. Cl.
CPC ........ *G02B 5/305* (2013.01); *B29D 11/00644* (2013.01); *B29D 11/00865* (2013.01);
(Continued)

(58) Field of Classification Search
CPC .... G02B 27/286; G02B 5/1809; G02B 5/305; G02B 5/3083; G02B 1/11; G02B 1/14;
(Continued)

(56) References Cited

U.S. PATENT DOCUMENTS 4,181,756 A   1/1980  Fergason
4,396,646 A   8/1983  Schuler et al.
(Continued)

FOREIGN PATENT DOCUMENTS

JP    5862381 U    4/1983
JP    5865076 U    5/1983
(Continued)

OTHER PUBLICATIONS

"Concentrative Properties of Aqueous Solutions Density, Refractive Index, Freezing Point Depression, and Viscosity," in CRC Handbook of Chemistry and Physics, 98th Edition (Internet Version 2018), John R. Rumble, ed., CRC Press/Taylor & Francis, Boca Raton, FL.*

*Primary Examiner* — William R Alexander
*Assistant Examiner* — Henry A Duong
(74) *Attorney, Agent, or Firm* — Dentons US LLP (57) ABSTRACT

The present invention relates to a method for manufacturing a polarizing plate, the method including: preparing a polarizing plate where a protection film is laminated on one surface of a polyvinyl alcohol-based polarizer dyed with at least one or more of iodine and dichromatic dyes; and forming a depolarization region having single transmittance of 80% or more at a wavelength band in a range of 400 nm to 800 nm by bringing a decoloring solution including 1 to (Continued)

30 wt % of a decolorant into local contact with the other surface of the polarizer, and a polarizing plate manufactured by using the same.

17 Claims, 2 Drawing Sheets

(51) Int. Cl.
| | |
|---|---|
| G02B 1/14 | (2015.01) |
| B29D 11/00 | (2006.01) |
| G02F 1/1335 | (2006.01) |
| H04N 5/232 | (2006.01) |
| B32B 7/12 | (2006.01) |
| G02B 1/11 | (2015.01) |
| B32B 7/06 | (2006.01) |
| B32B 27/08 | (2006.01) |
| B32B 27/28 | (2006.01) |
| B32B 27/32 | (2006.01) |
| B32B 27/36 | (2006.01) |
| B32B 27/40 | (2006.01) |
| B29K 629/00 | (2006.01) |

(52) U.S. Cl.
CPC ......... *B29D 11/00894* (2013.01); *B32B 7/06* (2013.01); *B32B 7/12* (2013.01); *B32B 27/08* (2013.01); *B32B 27/28* (2013.01); *B32B 27/30* (2013.01); *B32B 27/306* (2013.01); *B32B 27/308* (2013.01); *B32B 27/32* (2013.01); *B32B 27/325* (2013.01); *B32B 27/36* (2013.01); *B32B 27/365* (2013.01); *B32B 27/40* (2013.01); *G02B 1/11* (2013.01); *G02B 1/14* (2015.01); *G02B 5/3083* (2013.01); *G02F 1/133528* (2013.01); *G02F 1/133533* (2013.01); *H04N 5/23293* (2013.01); *B29K 2629/04* (2013.01); *B29K 2995/002* (2013.01); *B29K 2995/0034* (2013.01); *B29K 2995/0077* (2013.01); *B32B 2260/02* (2013.01); *B32B 2260/04* (2013.01); *B32B 2307/308* (2013.01); *B32B 2307/402* (2013.01); *B32B 2307/412* (2013.01); *B32B 2307/42* (2013.01); *B32B 2307/50* (2013.01); *B32B 2307/516* (2013.01); *B32B 2307/518* (2013.01); *B32B 2307/538* (2013.01); *B32B 2307/54* (2013.01); *B32B 2307/732* (2013.01); *B32B 2307/75* (2013.01); *B32B 2329/04* (2013.01); *B32B 2457/20* (2013.01); *B32B 2457/202* (2013.01); *B32B 2551/00* (2013.01)

(58) Field of Classification Search
CPC ..... G02B 5/30; G02B 5/3058; G03F 7/70566; B29D 11/0074; B29D 11/00894; B29D 11/00865; B29D 11/00644; B32B 27/32; B32B 7/12; B32B 27/306; B32B 27/40; B32B 27/365; B32B 27/36; B32B 27/308; B32B 27/28; B32B 27/08; B32B 7/06; B32B 27/325; B32B 27/30; B32B 2307/516; B32B 2457/202; B32B 2457/20; B32B 2307/402; B32B 2307/42; B32B 2307/412; B32B 2307/308; B32B 2260/04; B32B 2329/04; B32B 2551/00; B32B 2260/02; B32B 2307/732; B32B 2307/54; B32B 2307/538; B32B 2307/518; B32B 2307/50; B32B 2307/75; H04N 5/23293; G02F 1/1335; B29K 2995/002; B29K 2995/0034; B29K 2629/04; B29K 2995/0077
USPC .................................................. 359/486.01
See application file for complete search history.

(56) References Cited

U.S. PATENT DOCUMENTS

| | | | |
|---|---|---|---|
| 10,009,525 B2 | 6/2018 | Mathew et al. | |
| 2002/0054261 A1* | 5/2002 | Sekiguchi | G02F 1/13338 349/122 |
| 2012/0105400 A1 | 5/2012 | Mathew et al. | |
| 2012/0106063 A1 | 5/2012 | Mathew et al. | |
| 2014/0036175 A1* | 2/2014 | Morishima | G02B 5/3016 349/15 |
| 2015/0153495 A1 | 6/2015 | Matsuda et al. | |
| 2017/0129197 A1 | 5/2017 | Yaegashi et al. | |

FOREIGN PATENT DOCUMENTS

| | | | |
|---|---|---|---|
| JP | S58168020 A | * | 10/1983 |
| JP | 6036563 B2 | | 8/1985 |
| JP | 2013-167835 A | | 8/2013 |
| JP | 2016-027394 A | | 2/2016 |
| KR | 10-2010-0125537 A | | 12/2010 |
| KR | 10-2010-0125558 A | | 12/2010 |
| KR | 10-2010-0125560 A | | 12/2010 |
| KR | 2010-0125537 A | | 12/2010 |
| KR | 2010-0125558 A | | 12/2010 |
| KR | 10-2011-0110889 A | | 10/2011 |
| KR | 2012-0046035 A | | 5/2012 |
| KR | 2012-0046040 A | | 5/2012 |
| TW | 201224716 A1 | | 6/2012 |
| TW | 201339660 A | | 10/2013 |

* cited by examiner

METHOD FOR PREPARING POLARIZING PLATE LOCALLY HAVING DEPOLARIZATION REGION, AND POLARIZING PLATE PREPARED BY USING SAME

TECHNICAL FIELD

This application is a National Stage Entry of International Application No. PCT/KR2015/006420 filed on Jun. 24, 2015, and claims the benefit of and priority to Korean Application No. 10-2014-0080490, filed on Jun. 30, 2014 and Korean Application No. 10-2014-0129209, filed on Sep. 26, 2014 all of which are hereby incorporated by reference in their entirety for all purposes as if fully set forth herein.

The present invention relates to a method for manufacturing a polarizing plate, and a polarizing plate manufactured by using the same, and more particularly, to a polarizing plate locally having a depolarization region to be suitable for equipment of parts such as camera modules and color formation, and a method for manufacturing the same.

BACKGROUND ART

A polarizing plate is applied to various display devices such as a liquid crystal display and an organic electroluminescent device. Recently, the mainly used polarizing plate is in a form where a protection film is laminated on one surface or both surfaces of a PVA polarizer manufactured by alignment by a method for dyeing iodine and/or dichromatic dyes on a polyvinyl alcohol (hereinafter, PVA)-based film, and then cross-linking the iodine and/or dichromatic dyes by using boric acid and the like, followed by elongation.

Meanwhile, there is a current trend toward increasing slimness of the display device, and in order to implement a large screen, the display device has been developed toward a trend where thicknesses of a bezel portion and an edge where the screen is not displayed are minimized. Further, in order to implement various functions, parts such as cameras tend to be equipped in a display device, and in consideration of a design factor, efforts of providing various colors to a product logo or an edge region or decoloring the product logo or the edge region have been made.

However, in the case of a polarizing plate in the related art, since an entire region of the polarizing plate is dyed with iodine and/or dichromatic dyes, the polarizing plate has a dark black color, and as a result, there are problems in that it is difficult to provide various colors to a display device, and particularly, in the case where the polarizing plate is positioned on parts such as cameras, 50% or more of the quantity of light is absorbed by the polarizing plate to reduce visibility of a camera lens.

In order to solve the problems, a method for physically removing a portion of the polarizing plate, which covers the camera lens, by piercing a hole (boring) in the portion of the polarizing plate by a method such as punching and cutting has been commercialized.

However, the aforementioned physical method degrades an appearance of the image display, and the polarizing plate may be damaged due to characteristics of a process of piercing the hole. Meanwhile, in order to prevent damage such as tearing of the polarizing plate, a bored portion of the polarizing plate should be formed in a region sufficiently far away from a corner, and as a result, there is a problem in that in the case when the polarizing plate is applied, the bezel portion of the image display is relatively widened which deviates from a current narrow bezel design trend of the image display. Further, there is a problem in that in the case where a camera module is equipped in the bored portion of the polarizing plate, as described above, since the camera lens is exposed to the outside, the camera lens is easily contaminated and damaged when the camera lens is used over a long period of time.

Therefore, in order to overcome the aforementioned problems, a development of a new process of providing a method for decoloring a local region of a polarizer without boring to form a depolarization region, and simultaneously, suppressing fine wrinkles and surface roughness that may occur in the depolarization region to reduce a haze is needed.

DETAILED DESCRIPTION OF THE INVENTION

Technical Problem

The present invention has been made in an effort to solve the aforementioned problems, to provide a polarizing plate where polarization of some regions of the polarizing plate is removed and a method for manufacturing the same, and to provide a polarizing plate where surface roughness and a haze are excellent by removing polarization while a hole is not physically pierced like the related art, and simultaneously, minimizing wrinkles of the region from which polarization is removed.

Technical Solution

According to an exemplary embodiment of the present invention, the present invention provides a method for manufacturing a polarizing plate, the method including: preparing a polarizing plate where a protection film is laminated on one surface of a polyvinyl alcohol-based polarizer dyed with at least one or more of iodine and dichromatic dyes; and forming at least one depolarization region having single transmittance of 80% or more at a wavelength band in a range of 400 nm to 800 nm by bringing a decoloring solution including 1 to 30 wt % of a decolorant into local contact with the other surface of the polarizer.

Further, it is preferable that the decolorant includes one kind or more selected from the group consisting of sodium hydroxide (NaOH), sodium hydrosulfide (NaSH), sodium azide (NaN$_3$), potassium hydroxide (KOH), potassium hydrosulfide (KSH), and potassium thiosulfate (KS$_2$O$_3$).

It is preferable that a pH of the decoloring solution is 11 to 14 and a viscosity of the decoloring solution be 1 cP to 2000 cP.

Meanwhile, it is preferable that the decoloring solution further includes a viscosity agent, and it is preferable that the viscosity agent includes one kind or more selected from the group consisting of a polyvinyl alcohol-based resin, a polyvinyl acetoacetate-based resin, an acetoacetyl group-denatured polyvinyl alcohol-based resin, butenediolvinyl alcohols, a polyethylene glycol-based resin, and a polyacrylamide-based resin.

In this case, it is preferable that the method further includes, after the forming of the depolarization region, performing washing by using alcohol or an acid solution.

Further, the manufacturing method of the present invention may further include, if necessary, after the forming of at least one depolarization region, forming an optical layer on at least one surface of the polarizing plate.

Further, the method may further include, after the forming of the depolarization region, forming an optical layer on at least one surface of the polarizing plate, and the optical layer may be a protection film, a retardation film, a luminance improvement film, a hard coating layer, an antireflection layer, a cohesive layer, an adhesion layer, or a combination thereof.

Further, the present invention provides a polarizing plate manufactured by the aforementioned manufacturing method, the polarizing plate including: a polyvinyl alcohol-based polarizer dyed with at least one or more of iodine and dichromatic dyes, and a protection film laminated on at least one surface of the polyvinyl alcohol-based polarizer, in which the polarizing plate locally has a depolarization region having single transmittance of 80% or more at a wavelength band in a range of 400 nm to 800 nm, and arithmetic mean roughness (Ra) of the depolarization region is 100 nm or less.

Further, it is preferable that root mean square roughness (Rq) of the depolarization region is 100 nm or less.

In this case, in the depolarization region of the polarizer, the polarization degree may be 20% or less, and in a region other than the depolarization region, single transmittance may be 40% to 45% and the polarization degree may be 99% or more.

Further, it is preferable that in the depolarization region of the polarizing plate, a haze is 3% or less.

In this case, it is preferable that in the depolarization region, a content of at least one or more of the iodine and dichromatic dyes is 0.1 wt % to 0.5 wt %, and in a region other than the depolarization region, the content of at least one or more of the iodine and dichromatic dyes is 1 wt % to 4 wt %.

The area of the depolarization region according to the aforementioned manufacturing method and the area of the depolarization region according to the aforementioned polarizing plate may be 0.5 $mm^2$ or more and 500 $mm^2$ or less.

Advantageous Effects

The present invention can minimize damage such as holes or tearing of a polarizing plate by bringing a decoloring solution into contact with some regions of a polyvinyl alcohol-based polarizer to depolarize the corresponding region. In the case where the polarizing plate of the present invention manufactured by the aforementioned method is used, even though the polarizing plate is equipped on parts such as cameras, a problem caused by a reduction in luminance does not occur.

Further, in the manufacturing method of the present invention, first, after a protection film is laminated on one surface of the polarizer, decoloring is performed, and thus it is possible to provide the polarizing plate where surface roughness and a haze of the depolarization region are excellent by suppressing a phenomenon where the polarizer absorbs moisture to be swollen in a decoloring process and thus minimizing fine wrinkles.

BEST MODE

Hereinafter, preferred exemplary embodiments of the present invention will be described. However, exemplary embodiments of the present invention can be modified into various other forms, and the scope of the present invention is not limited to the exemplary embodiments as will be described below. Further, the exemplary embodiments of the present invention are provided so that those skilled in the art may more completely understand the present invention.

The present inventors found that in the case where a decoloring solution comes into selective contact with some regions of a polyvinyl alcohol-based polarizer dyed with iodine and/or dichromatic dyes to locally form a depolarization region, unlike a physical removing method such as punching and cutting, boring was not formed, and fine wrinkles of the depolarization region can be minimized by laminating a protection film on one surface of the polarizer and then performing a decoloring process to suppress a swelling phenomenon of the polarizer, thereby accomplishing the present invention.

A method for manufacturing a polarizing plate according to the present invention includes step i) of preparing the polarizing plate where a protection film is laminated on one surface of a polyvinyl alcohol-based polarizer dyed with at least one or more of iodine and dichromatic dyes; and step ii) of forming a depolarization region having single transmittance of 80% or more at a wavelength band in a range of 400 nm to 800 nm by bringing a decoloring solution including 1 to 30 wt % of a decolorant into local contact with the other surface of the polarizer.

In the present specification, "single transmittance" is represented by an average value of transmittance of an absorption axis and transmittance of a transmission axis of the polarizing plate. Further, "single transmittance" and "the polarization degree" of the present specification are values measured by using the V-7100 model manufactured by JASCO company.

Generally, in the case where the decoloring solution comes into direct contact with the polyvinyl alcohol-based polarizer on which the protection film is not laminated, the swelling phenomenon of the polarizer occurs due to moisture, and thus the wrinkles may be formed in the depolarization region and a surrounding region thereof. In this case, surface roughness of the depolarization region is increased to increase a haze, and thus it may be difficult to sufficiently secure an appearance of the polarizing plate and camera visibility. However, like the present invention, in the case where before contact of the decolorant, the protection film is laminated on one surface of the polarizer, since the protection film and the polarizer are adhered to each other, the occurrence of the swelling phenomenon and the wrinkles may be suppressed.

Hereinafter, each step of the manufacturing method of the present invention will be more specifically described.

First, step i) of preparing the polarizing plate where the protection film is laminated on one surface of the polyvinyl alcohol-based polarizer dyed with at least one or more of the iodine and dichromatic dyes may be performed through a method for manufacturing a polarizing plate, which is well known in the corresponding technical field, or may be performed by a method of purchasing a polarizing plate commercially available on the market, in which a protection film is laminated on one surface of a polarizer.

Meanwhile, as an example of the method for manufacturing the polarizing plate, it is possible to use the method including: a step of preparing the polyvinyl alcohol-based polarizer dyed with the iodine and/or dichromatic dyes; and a step of laminating the protection film on one surface of the polarizer. For example, the step of preparing the polyvinyl alcohol-based polarizer may be performed through a dyeing step of dyeing a polyvinyl alcohol-based polymer film with the iodine and/or dichromatic dyes, a cross-linking step of cross-linking the polyvinyl alcohol-based film and the dye, and an elongation step of elongating the polyvinyl alcohol-based film, but the step is not limited thereto.

First, the dyeing step is configured to dye the iodine molecules and/or dichromatic dyes on the polyvinyl alcohol-based film, and the iodine molecules and/or dichromatic dye molecules may absorb light that vibrates in an elongation direction of the polarizer and allow light that vibrates in a vertical direction to pass, thus obtaining polarization having a predetermined vibration direction. In this case, the dyeing may be, for example, performed by impregnating the polyvinyl alcohol-based film in a treatment bath including an iodine solution and/or a solution containing the dichromatic dye.

In this case, as a solvent used in the solution of the dyeing step, water is generally used, but an organic solvent having compatibility with water may be added in an appropriate amount. Meanwhile, the iodine and/or dichromatic dyes may be used in a content of 0.06 parts by weight to 0.25 parts by weight based on 100 parts by weight of the solvent. The reason is that in the case where the content of the dichromatic material such as iodine is in the aforementioned range, transmittance of the polarizer manufactured after elongation may satisfy the range of 40.0% to 47.0%.

Meanwhile, in the case where iodine is used as the dichromatic material, in order to improve dyeing efficiency, it is preferable that a supplement agent such as an iodide compound is further contained, and the supplement agent may be used at a ratio of 0.3 parts by weight to 2.5 parts by weight based on 100 parts by weight of the solvent. In this case, the supplement agent such as the iodide compound is added in order to increase solubility of iodine to water because solubility of iodine to water is low. Meanwhile, it is preferable that a mixing ratio of iodine and the iodide compound is 1:5 to 1:10 on the basis of a weight.

In this case, specific examples of the iodide compound that may be added in the present invention may include potassium iodide, lithium iodide, zinc iodide, aluminum iodide, lead iodide, copper iodide, barium iodide, calcium iodide, tin iodide, titanium iodide, a mixture thereof, or the like, but are not limited thereto.

Meanwhile, it is preferable that a temperature of the treatment bath is maintained at 25° C. to 40° C. In the case where the temperature of the treatment bath is less than 25° C., which is low, dyeing efficiency may be reduced, and much sublimation of iodine may occur at a very high temperature that is more than 40° C. to increase a use amount of iodine.

In this case, it is preferable that an immersion time of the polyvinyl alcohol-based film in the treatment bath is 30 seconds to 120 seconds. This is because in the case where the immersion time is less than 30 seconds, dyeing may not be uniformly performed on the polyvinyl alcohol-based film, and in the case where the immersion time is more than 120 seconds, dyeing is saturated, and thus immersion is not needed any longer.

Meanwhile, the cross-linking step is configured to adsorb the iodine and/or dichromatic dyes on a polyvinyl alcohol polymer matrix, and a deposition method for performing the cross-linking step by depositing the polyvinyl alcohol-based film in a cross-linking bath including a boric acid aqueous solution and the like is generally used, but the method is not limited thereto, and the cross-linking step may be performed by an application method or spray method for applying or spraying a solution including a cross-linking agent on the polyvinyl alcohol-based film.

In this case, as a solvent used in the solution of the cross-linking bath, water is generally used, but an organic solvent having compatibility with water may be added in an appropriate amount, and the cross-linking agent may be added in an amount of 0.5 parts by weight to 5.0 parts by weight based on 100 parts by weight of the solvent. In this case, in the case where the cross-linking agent is contained in the amount of less than 0.5 parts by weight, cross-linking is insufficient in the polyvinyl alcohol-based film, and thus strength of the polyvinyl alcohol-based film in water may be reduced, and in the case where the amount is more than 5.0 parts by weight, excessive cross-linking is formed, and thus an elongation property of the polyvinyl alcohol-based film may deteriorate. Further, specific examples of the cross-linking agent may include a boron compound such as a boric acid and borax, glyoxal, glutaraldehyde, and the like, and may be used alone or may be used in combination.

Meanwhile, a temperature of the cross-linking bath depends on the amount and an elongation ratio of the cross-linking agent and is not limited thereto, but, generally, it is preferable that the temperature is 45° C. to 60° C. Generally, if the amount of the cross-linking agent is increased, in order to improve mobility of chains of the polyvinyl alcohol-based film, the temperature of the cross-linking bath is adjusted to a high temperature condition, and if the amount of the cross-linking agent is small, the temperature of the cross-linking bath is adjusted to a relatively low temperature condition. However, since the present invention is a process of performing five times or more elongation, in order to improve the elongation property of the polyvinyl alcohol-based film, the temperature of the cross-linking bath should be maintained at 45° C. or more. Meanwhile, it is preferable that the immersion time of the polyvinyl alcohol-based film in the cross-linking bath is 30 seconds to 120 seconds. The reason is that in the case where the immersion time is less than 30 seconds, cross-linking may not be uniformly performed on the polyvinyl alcohol-based film, and in the case where the immersion time is more than 120 seconds, cross-linking is saturated, and thus immersion is not needed any longer.

Meanwhile, elongation in the elongation step is configured to align polymer chains of the polyvinyl alcohol-based film in a predetermined direction, and an elongation method may be classified into a wet elongation method and a dry elongation method, the dry elongation method is classified into an inter-roll elongation method, a heating roll elongation method, a compression elongation method, a tenter elongation method, and the like, and the wet elongation method is classified into a tenter elongation method, an inter-roll elongation method, and the like.

In this case, it is preferable that in the elongation step, the polyvinyl alcohol-based film is elongated at an elongation ratio of 4 times to 10 times. The reason is that the polymer chains of the polyvinyl alcohol-based film should be aligned in order to provide polarization performance to the polyvinyl alcohol-based film, and the chains may not be sufficiently aligned at the elongation ratio of less than 4 times, and the chains of the polyvinyl alcohol-based film may be cut at the elongation ratio of more than 10 times.

In this case, it is preferable that the elongation is performed at an elongation temperature of 45° C. to 60° C. This is because the elongation temperature may depend on the content of the cross-linking agent, mobility of the chains of the polyvinyl alcohol-based film may be reduced at the temperature of less than 45° C. to reduce elongation efficiency, and in the case where the temperature is more than 60° C., the polyvinyl alcohol-based film may be softened to weaken strength. Meanwhile, the elongation step may be performed simultaneously with the dyeing step or the cross-linking step or separately from the dyeing step or the cross-linking step.

Meanwhile, the elongation may be performed with only the polyvinyl alcohol-based film, or may be performed by a method of laminating a base film on the polyvinyl alcohol-based film and then elongating the polyvinyl alcohol-based film and the base film together. In the latter method, in the case where the polyvinyl alcohol-based film having a small thickness (for example, PVA film of 60 µm or less) is elongated, in the elongation process, elongation may be used in order to prevent the polyvinyl alcohol-based film from being broken, and may be used in order to manufacture a thin PVA polarizer of 10 µm or less.

In this case, as the base film, polymer films having a maximum elongation magnification of 5 times or more under a temperature condition of 20° C. to 85° C. may be used, and for example, a high density polyethylene film, a polyurethane film, a polypropylene film, a polyolefin film, an ester-based film, a low density polyethylene film, high density polyethylene and low density polyethylene co-extrusion films, a copolymer resin film in which ethylene vinyl acetate is contained in high density polyethylene, an acryl film, a polyethylene terephthalate film, a polyvinyl alcohol-based film, a cellulose-based film, and the like may be used. Meanwhile, the maximum elongation magnification means an elongation magnification immediately before breakage occurs.

Further, a lamination method of the base film and the polyvinyl alcohol-based film is not particularly limited. For example, the base film and the polyvinyl alcohol-based film may be laminated via an adhesive or a cohesive agent, or may be laminated by a mode where the polyvinyl alcohol-based film is set on the base film without a separate medium. Further, lamination may be performed by a method of co-extruding a resin forming the base film and a resin forming the polyvinyl alcohol-based film, or may be performed by a method of applying a polyvinyl alcohol-based resin on the base film. Meanwhile, the base film may be detached from the polarizer and removed after elongation is completed, but may not be removed but be subjected to a next step. In this case, the base film may be used as a polarizer protection film which will be described below and the like.

Next, in the present invention, if the polyvinyl alcohol-based polarizer is prepared through the aforementioned method, the step of laminating the protection film on one surface of the polyvinyl alcohol-based polarizer is performed.

In this case, the protection film is a film for protecting the polarizer having a very small thickness, and refers to a transparent film attached onto one surface of the polarizer, and a film having excellent mechanical strength, thermal stability, moisture blocking property, and isotropicity may be used. For example, an acetate-based resin film such as triacetyl cellulose (TAC), and polyester-based, polyethersulfone-based, polycarbonate-based, polyamide-based, polyimide-based, polyolefin-based, cycloolefin-based, polyurethane-based, and acryl-based resin films, and the like may be used, but the protection film is not limited thereto.

Further, the protection film may be an isotropic film or an anisotropic film to which an optical compensation function such as retardation is provided, and the protection film may be constituted as one film or may be constituted by attaching two films or more. Further, the protection film may be a non-elongated film or a uniaxially or biaxially elongated film, and a thickness of the protection film may be generally 1 µm to 500 µm and preferably 1 µm to 300 µm.

In this case, adhesion force of the protection film to the polyvinyl alcohol-based polarizer may be preferably 1N/2 cm or more and more preferably 2N/2 cm or more. Specifically, the aforementioned adhesion force means adhesion force measured by 90° stripping force by using a texture analyzer after the protection film is attached onto the polyvinyl alcohol-based polarizer dyed with at least one or more of the iodine and dichromatic dyes. In the case where the adhesion force satisfies the aforementioned range, swelling of the protection film and the polyvinyl alcohol-based polarizer may be suppressed, and in a manufacturing process, the occurrence of curls and defects may be minimized.

Meanwhile, in the step of laminating the protection film on one surface of the polyvinyl alcohol-based polarizer, the protection film is attached onto the polarizer, and attachment may be performed by using an adhesive. In this case, attachment may be performed through a lamination method of films well known in the corresponding technical field, and for example, attachment may be performed by using an adhesive well known in the corresponding technical field, such as a water-based adhesive such as a polyvinyl alcohol-based adhesive, a thermosetting adhesive such as a urethane-based adhesive, a light cation curable adhesive such as an epoxy-based adhesive, and a light radical curable adhesive such as an acryl-based adhesive.

Next, in the present invention, as described above, after the polarizing plate where the protection film is laminated on one surface of the polyvinyl alcohol-based polarizer is prepared, step ii) of forming the depolarization region having single transmittance of 80% or more at the wavelength band in a range of 400 nm to 800 nm by bringing the decoloring solution including 1 to 30 wt % of the decolorant into local contact with the other surface of the polarizer is performed.

In this case, the other surface of the polarizer refers to an opposite surface where the protection film is not laminated, in the polarizer of step i) on which the protection film is laminated on one surface thereof. That is, since the decoloring solution should come into direct contact with the polyvinyl alcohol-based polarizer, not the protection film, the present step should be performed over the other surface of the polarizer.

Meanwhile, the decoloring solution essentially includes a decolorant, which may decolor the iodine and/or dichromatic dyes, and a solvent. The decolorant is not particularly limited as long as the decolorant can decolor the iodine and/or dichromatic dyes dyed on the polarizer, but, for example, it is preferable that the decolorant includes one kind or more selected from the group consisting of sodium hydroxide (NaOH), sodium hydrosulfide (NaSH), sodium azide ($NaN_3$), potassium hydroxide (KOH), potassium hydrosulfide (KSH), and potassium thiosulfate ($KS_2O_3$).

As the solvent, it is preferable that water such as distilled water is used. Further, the solvent may be used while being additionally mixed with an alcohol-based solvent. For example, the solvent may be used while being mixed with methanol, ethanol, butanol, isopropyl alcohol, or the like, but the solvent is not limited thereto.

Meanwhile, the content of the decolorant in the decoloring solution may be changed according to a contact time in a decoloring process, but the decolorant may be included in the content of preferably 1 wt % to 30 wt % and more preferably 5 wt % to 15 wt %, based on the total weight of the decoloring solution. In the case where the content of the decolorant is less than 1 wt %, decoloring is not performed or decoloring is performed for a time of decades minutes or more, and thus it is difficult to substantially apply the decolorant, and in the case where the content thereof is more than 30 wt %, since the decoloring solution is not easily diffused into the polarizer, an increment in decoloring efficiency is insignificant, and thus economic feasibility is reduced.

Further, the pH of the decoloring solution is 11 to 14 and more preferably 13 to 14. The decolorant of the present invention is a strong basic compound and should have a strong basic property enough to break boric acid forming a cross-linking bond with polyvinyl alcohol, and in the case where the pH satisfies the aforementioned range, decoloring may occur well. For example, as a solution decomposing (decoloring) iodine to secure transparency (iodine clock reaction), sodium thiosulfate (pH 7) may cause decoloring in a general iodine compound aqueous solution but does not cause decoloring in an actual polarizer (PVA) even though contact is performed over a long period of time (10 hours). That is, this refers to that the cross-linking bond of the boric acid needs to be broken due to the strong base before iodine is decomposed.

Meanwhile, in the present invention, the step of forming the depolarization region by bringing the decoloring solution into contact with the polarizer may be performed by using a printing device and the like, and in this case, the step may be performed by a non-contact type printing method where the decolorant is applied on a desired local portion or in a pattern having a desired shape by using a dispenser or inkjet, or a contact type printing method such as gravure printing, but the printing device is not limited thereto.

To be more specific, in consideration of easiness of performing a continuous process, it is preferable that the aforementioned device is a device performing printing by an inkjet marking method, a gravure printing method, or the like. In this case, the inkjet marking method refers to a printing method performed in a mode where ink liquid drops are dripped on a target (PVA polarizer) to be printed through an inkjet nozzle, and the gravure printing method refers to a printing method performed in a mode where ink is filled in a printing roll on which a shape to be printed is engraved, ink of a region other than the engraved portion is removed through a doctor blade and the like to allow ink to remain in only the engraved portion, and the ink filled in the engraved portion is then transferred onto a target (PVA polarizer) to be printed by using a transferring roll.

Further, in the present specification, the step of forming the depolarization region by bringing the decoloring solution into contact with the polarizer may be performed by using an immersion method. Specifically, in the immersion method, after a mask layer is formed on one surface of the polarizer, the polarizer including the protection film and the release film may be immersed in the decoloring solution.

According to the exemplary embodiment of the present specification, the method may further include, before the step of forming the depolarization region, forming a mask layer including at least one or more bored portions on the other surface of the polarizer. In this case, the mask layer may be formed of a mask film or a coating layer.

According to the exemplary embodiment of the present specification, the step of forming the mask layer may be performed before the step of providing the protection film and the release film.

There are merits in that in the case where before the step of forming the depolarization region, the step of forming the mask layer is performed, since a portion not requiring depolarization, that is, a portion not requiring decoloring is not covered by the mask layer, a defect occurrence ratio in a roll-to-roll process may be reduced, and since the polyvinyl alcohol-based polarizer and the mask layer are laminated, a process speed is not limited.

If the polarizer where the mask layer including the bored portion is formed is immersed in the decoloring solution, the decoloring solution comes into contact with the polyvinyl alcohol-based polarizer through the bored portion, and as a result, decoloring partially occurs in only a portion corresponding to a bored portion region. According to another exemplary embodiment, in the case where the mask film is used as the mask layer, the step of forming the mask layer may include: forming the bored portion in the mask film; and attaching the mask film onto the other surface of the polarizer.

Specifically, in the step of forming the mask layer, the bored portion may be formed in at least one region of the mask film, and the mask film may be attached onto the other surface of the polarizer. Further, in the step of forming the mask layer, a coating layer may be formed on the other surface of the polarizer, and at least one region of the coating layer may be selectively removed to form the bored portion.

In this case, as the mask film, an olefin-based film such as polyethylene (PE), polypropylene (PP), and polyethylene terephthalate (PET); or a vinyl acetate-based film such as ethylene vinyl acetate (EVA) and polyvinyl acetate may be used, but the mask film is not limited thereto. Further, the thickness of the mask film may be 10 μm to 100 μm and preferably 10 μm to 70 μm, but is not limited thereto.

The step of forming the bored portion in the mask film is not particularly limited, and may be performed through film boring methods well known in the corresponding technical field, for example, die processing, knife processing, laser processing, and the like.

According to the exemplary embodiment of the present specification, the step of forming the bored portion may be performed through laser processing. The laser processing may be performed by using laser processing devices generally known in the corresponding technical field, but is not particularly limited. Laser processing conditions such as a kind, power, and a laser pulse repetition rate of the laser device may be changed according to a material or a thickness of the film, a shape of the bored portion, and the like, and in consideration of the aforementioned matters, a person with ordinary skill in the art may appropriately select the laser process conditions. For example, in the case where the polyolefin film having a thickness of 30 μm to 100 μm is used as the mask film, the bore portion may be formed by using a carbon dioxide ($CO_2$) laser device having a central wavelength of about 9 μm to 11 μm, a UV device having a central wavelength of about 300 nm to 400 nm, or the like, and in this case, maximum average power of the laser device may be about 0.1 W to 30 W and the pulse repetition rate thereof may be about 0 kHz to 50 kHz, but the laser device is not limited thereto.

The step of forming the bored portion may be performed before or after the step of attaching the mask film onto the other surface of the polarizer. In other words, the bored portion may be previously formed in the mask film and the mask film where the bored portion is formed may be then attached onto the polarizer, or the mask film may be attached onto the polarizer and the bored portion may be then formed.

The step of attaching the mask film onto the other surface of the polarizer may be performed by film lamination methods well known in the corresponding technical field, for example, a method for attaching the mask film and a polarizing member through a cohesive layer, and in this case, the cohesive layer may be formed by applying a cohesive agent, such as an acryl-based cohesive agent, a silicon-based cohesive agent, an epoxy-based cohesive agent, and a rubber-based cohesive agent, on the mask film or the polarizing member, but the method and the cohesive agent are not limited thereto. For example, in the case where films having self-cohesive force (for example, EVA film, PVAC film, PP film, and the like) are used as the mask film, the mask film may be directly attached onto the other surface of the polarizer while the cohesive layer is not formed.

According to the exemplary embodiment of the present specification, in the case where the mask layer is formed by the coating layer, the step of forming the mask layer includes: forming the coating layer on the other surface of the polarizer; and forming the bored portion by selectively removing some regions of the coating layer.

The step of forming the coating layer may be performed by a method for applying a composition for forming the coating layer on the other surface of the polarizer, and then performing drying or irradiating heat or an active energy beam such as a UV beam or an electron beam to cure the coating layer.

A kind of the composition for forming the coating layer is not particularly limited as long as the composition may be etched by a laser and is not dissolved in an alkaline solution. For example, as the composition for forming the coating layer, a composition including a dispersible polymer resin such as water-dispersible polyurethane, water-dispersible polyester, and a water-dispersible acryl copolymer, or a photosensitive resin composition may be used. Meanwhile, as the photosensitive resin composition, photosensitive resin compositions that are available on the market, for example, a positive type photoresist, a negative type photoresist, or the like may be used, but the photosensitive resin composition is not particularly limited.

According to the exemplary embodiment of the present specification, the coating layer may be formed by using the polymer resin composition or the photosensitive resin composition.

A method for applying the composition for forming the coating layer is not particularly limited, and application may be performed through an application method generally used in the corresponding technical field, for example, bar coating, spin coating, roll coating, knife coating, spray coating, or the like, and the curing may be performed by a method for applying heat or irradiating the active energy beam, such as the ultraviolet beam or the electron beam, on the applied resin composition.

According to the exemplary embodiment of the present specification, a thickness of the coating layer may be 100 nm to 500 nm. There are merits in that in the case where the thickness of the coating layer satisfies the aforementioned numerical range, when the bored portion is processed, the polyvinyl alcohol-based polarizer may be prevented from being damaged, and a process of removing the coating layer after the decoloring process need not be additionally performed.

The step of forming the bored portion by selectively removing some regions of the coating layer may be performed by a method for irradiating the energy beam on some regions of the coating layer, followed by vaporization, a photolithography method, or the like.

The method for vaporizing some of the coating layer may be performed by using devices generally known in the corresponding technical field, for example, a UV laser device having a central wavelength of 300 nm to 400 nm, an IR laser device having a central wavelength of 1000 nm to 1100 nm, a green laser device having a central wavelength of 500 nm to 550 nm, or the like. Meanwhile, laser processing conditions such as a kind, laser power, and a pulse repetition ratio of the used laser device may be changed according to a kind and a thickness of the coating layer, formation of the bored portion to be formed, and the like, and in consideration of the aforementioned matters, a person with ordinary skill in the art may appropriately select the laser process conditions.

According to the exemplary embodiment of the present specification, the step of forming the bored portion by selectively removing some regions of the coating layer may be performed through laser processing.

Meanwhile, in the case where the coating layer is formed of the photosensitive resin composition, the bored portion may be formed through a photolithography process, and for example, the bored portion may be formed by a method for applying the photosensitive resin composition on the other surface of the polarizing plate, and selectively exposing the energy beam of a region corresponding to the bored portion, followed by developing by using a developing solution.

In this case, the exposure may be performed by using a light source such as an ultraviolet beam or an energy beam such as a laser. There are merits in that in the case where exposure is performed by using the laser, a separate mask may not be used for exposure, and a shape of the bored portion may be relatively freely formed.

To be more specific, in the exemplary embodiment of the present specification, in the case where the coating layer is formed in a thickness of 200 nm by using a photosensitive resin material, exposure may be performed by using a core having maximum average power of 0.1 W to 10 W and a UV laser of 300 nm to 400 nm, and in this case, an action pulse repetition rate of the laser may be 30 kHz to 100 kHz.

Meanwhile, in the developing, an appropriate developing solution may be selected to be used according to a kind of the used photosensitive resin, and in some cases, the aforementioned decoloring solution may be used as the developing solution. In this case, a separate developing step may not be performed.

Meanwhile, the bored portion may be formed to correspond to a shape of a region to be decolored, and a shape or a formation position thereof is not particularly limited. For example, the bored portion may be formed at a position at which parts such as a camera are equipped, so as to correspond to a shape of the parts, or may be formed in a region in which a product logo is printed in a shape of the product logo, or in the case where a color is provided to an edge portion of the polarizer, the bored portion may be formed at the edge portion of the polarizer to have a frame shape.

According to the exemplary embodiment of the present specification, after the step of forming the depolarization region, if necessary, a step of removing a mask layer may be further included. The step of removing the mask layer may be performed by a method for stripping the mask layer from the polarizer. In the case where the mask film is used as the mask layer, it is preferable to perform the present step, but in the case where the coating layer is used as the mask layer, the present step may not be performed. To be more specific, the step of removing the mask layer may be performed by a method for stripping the mask layer from the polarizer by using a stripping roll and the like.

Meanwhile, the viscosity of the decoloring solution may be 1 cP to 2000 cP and preferably 5 cP to 2000 cP. This is because in the case where the viscosity of the decoloring solution satisfies the aforementioned numerical range, a printing process may be smoothly performed, and diffusion or flowing down into the printed decoloring solution according to movement of the polarizing member in a continuous process line may be prevented, and thus the decoloring region may be formed in a desired shape in a desired region. Meanwhile, the viscosity of the decoloring solution may be appropriately changed according to surface properties of the used printing device and polarizer and the like. For example, in the case where the gravure printing method is used, the viscosity of the decoloring solution may be 1 cP to 2000 cP and preferably 5 cP to 200 cP, and in the case where the inkjet printing method is used, the viscosity of the decoloring solution may be 1 cP to 55 cP and preferably 5 cP to 20 cP.

Meanwhile, in order to allow the viscosity of the decoloring solution to satisfy the aforementioned range, it is preferable to use a method for further adding the viscosity agent. Therefore, the viscosity agent improves the viscosity of the decoloring solution to help to suppress diffusion of the solution and form the depolarization region having a desired size at a desired position. If the solution having the high viscosity is applied on the rapidly moving polarizer, since a relative speed difference between a liquid and the polarizer, which is generated when application is performed, is reduced, diffusion of the solution into an undesired portion is prevented, and fluidization of the solution, which is applied for a time when decoloring is performed until washing after application, is reduced, and thus the depolarization region having a desired position or size may be formed.

The viscosity agent is not limited as long as the viscosity agent can have low reactivity and increase the viscosity of the solution, but for example, it is more preferable that the viscosity agent includes one kind or more selected from the group consisting of a polyvinyl alcohol-based resin, a polyvinyl acetoacetate-based resin, an acetoacetyl group-denatured polyvinyl alcohol-based resin, butenediolvinyl alcohols, polyacrylamides, and polyethylene glycols.

Meanwhile, the viscosity agent may be included in the content of 0.5 wt % to 30 wt % and preferably 2.5 wt % to 15 wt %, based on the total weight of the decoloring solution. In the case where the content of the viscosity agent is more than the aforementioned range, the viscosity is excessively increased, and thus washing is not effectively performed, and in the case where the content of the viscosity agent is excessively low, the viscosity is low, and thus it is difficult to implement a decolored region having a desired shape and a desired size by diffusion and fluidization of the liquid.

Further, the depolarization region may have various shapes but is not limited thereto, and the depolarization region may be formed at any position on the entire polarizing plate.

The depolarization region may be continuously formed in one region of the polarizer not requiring a polarizing effect. Specifically, the depolarization region may be a region of the polarizer where a camera module is positioned.

Specifically, an area of at least one depolarization region may be 0.5 mm² or more and 500 mm² or less.

In the case where the decoloring solution comes into contact with the polarizer to form the depolarization region, distortion of an appearance of the polarizer may be accompanied and this may be increased as the area of the depolarization region is increased. Therefore, the present inventors found a condition of the decoloring solution and a treatment method thereof which may suppress surface wrinkles of the polarizer according to swelling of the polarizer to minimize a distortion phenomenon in the depolarization region even though one region of the polarizer having the area of 0.5 mm² or more and 500 mm² or less is depolarized by a chemical method.

Meanwhile, a depolarization mechanism through the depolarization step of the present invention will be specifically described below. It is known that a polyvinyl alcohol complex dyed with the iodine and/or dichromatic dyes may absorb light in a range of visible rays, such as the wavelength band in a range of 400 nm to 800 nm. In this case, if the decoloring solution comes into contact with the polarizer, the iodine and/or dichromatic dyes absorbing light having the visible-ray wavelength band existing in the polarizer are decomposed to decolor the polarizer and thus increase transmittance and reduce the polarization degree.

For example, in the case where the aqueous solution including potassium hydroxide (KOH), which is the decolorant, comes into contact with some regions of the polyvinyl alcohol-based polarizer dyed with iodine, as indicated by the following Chemical Formulas 1 and 2, iodine is decomposed by a series of processes. Meanwhile, in the case where a boric acid cross-linking process is performed when the polyvinyl alcohol-based polarizer dyed with iodine is manufactured, as described in the following Chemical Formula 3, potassium hydroxide directly decomposes the boric acid to remove a cross-linking effect through hydrogen bonding of polyvinyl alcohol and the boric acid.

$$12KOH+6I_2 \rightarrow 2KIO_3+10KI+6H_2O \qquad \text{[Chemical Formula 1]}$$

$$I_5^-+IO_3^-+6H^+ \rightarrow 3I_2+3H_2O$$

$$I_3^- \rightarrow I^-+I_2 \qquad \text{[Chemical Formula 2]}$$

$$B(OH)_3+3KOH \rightarrow K_3BO_3+3H_2O \qquad \text{[Chemical Formula 3]}$$

That is, iodine and/or iodine ion complexes such as $I_5^-$ (620 nm), $I_3^-$ (340 nm), and $I_2^-$ (460 nm) absorbing light in the visible-ray region are decomposed to generate $I^-$ (300 nm or less) or a salt thereof, thereby allowing most of the light in the visible-ray region to penetrate. Accordingly, since the polarizer is depolarized in the region of 400 nm to 800 nm, which is the visible-ray region, transmittance is entirely increased to make the polarizer transparent. In other words, in order to make polarization in the polarizer, arranged iodine complexes absorbing the visible rays may be decomposed into a unimolecular form not absorbing the visible rays, thereby performing depolarization.

It is preferable that the method for manufacturing the polarizing plate according to the present invention further includes, after the depolarization step, performing washing by using alcohol or an acid solution. This is because in the depolarization step, in the case where a residual decoloring solution is not appropriately washed, the solution is diffused or remains on the polarizer, and thus the depolarization region may be formed to have an undesired size and an undesired shape and it is difficult to form the depolarization region having a minute size.

Particularly, since it is easy to dry alcohol, alcohol can be easily removed, and alcohol does not affect transmittance or the polarization degree of the polarizer other than the depolarization region, and thus alcohol may be suitably used. For example, it is preferable that alcohol is ethanol, methanol, propanol, butanol, isopropyl alcohol, or a mixture thereof, but alcohol is not limited thereto. Further, in the case of the acid solution, the residual decolorant mainly having a basic property is subjected to a neutralization reaction with the acid solution to be removed, and as the acid solution, for example, an acetic acid aqueous solution, an adipic acid aqueous solution, a boric acid aqueous solution, a phosphoric acid aqueous solution, a lactic acid aqueous solution, a sulfuric acid aqueous solution, a nitric acid aqueous solution, or a mixture solution thereof may be used, but the acid solution is not limited thereto.

In the washing step, there is a method for immersing the polarizer in alcohol for 1 second to 180 seconds and more preferably 3 seconds to 30 seconds, or applying alcohol or the acid solution on a local portion decolored by contact with decoloring solution by using a dispenser, inkjet, or the like.

In the method for manufacturing the polarizing plate including the depolarization region of the present invention, washing using alcohol or the acid solution is performed after the decolorant is used, and thus, as described above, by the iodine compound, the salt, and the like formed by the decolorant are washed out, and the content of iodine and iodine ion complexes in the depolarization region is minimized. Accordingly, absorption of light by residual iodine and iodine ion complexes in the depolarization region is reduced to secure an effect of making the polarizer more transparent.

Further, the manufacturing method of the present invention may further include, not essentially but if necessary, after the forming of the depolarization region, forming an optical layer on at least one surface of the polarizing plate. In this case, the optical layer may be a polymer film layer such as a protection film or a retardation film, a functional film layer such as a luminance improvement film, or a functional layer such as a hard coating layer, an antireflection layer, and a cohesive layer.

Meanwhile, the optical layer may be directly attached onto or formed on the surface of the polyvinyl alcohol-based polarizer, or may be attached onto the protection film or the other coating layer attached onto one surface of the polyvinyl alcohol-based polarizer.

Next, a polarizing plate manufactured by using the method for manufacturing the polarizing plate according to the present invention will be described.

The polarizing plate according to the present invention includes: a polyvinyl alcohol-based polarizer dyed with at least one or more of iodine and dichromatic dyes, and a protection film laminated on at least one surface of the polyvinyl alcohol-based polarizer, in which the polarizing plate locally has a depolarization region having single transmittance of 80% or more at a wavelength band in a range of 400 nm to 800 nm, and arithmetic mean roughness (Ra) of the depolarization region is 100 nm or less.

In this case, the depolarization region of the polarizing plate, as described above, refers to a region formed through a process of bringing the decoloring solution into selective contact with some regions of the polyvinyl alcohol-based polarizer dyed with the iodine and/or dichromatic dyes.

In the depolarization region, single transmittance at the wavelength band in a range of 400 nm to 800 nm, which is the visible ray region, and preferably 450 nm to 750 nm is 80% or more and more preferably 90% or 92% or more. Further, the polarization degree of the depolarization region is 20% or less and more preferably 5% or less. As single transmittance of the depolarization region is increased and the polarization degree is decreased, visibility is improved, and thus performance and image quality of the camera lens to be positioned in the aforementioned region may be further improved.

Further, single transmittance of the region of the polarizing plate other than the depolarization region is preferably 40% to 45% and more preferably 42% to 45%. Moreover, the polarization degree of the region of the polarizing plate other than the depolarization region is preferably 99% or more. This is because the residual region other than the depolarization region should exhibit excellent optical properties like the aforementioned range by functioning as an original polarizing plate.

Meanwhile, in the polarizing plate according to the present invention, arithmetic mean roughness (Ra) of the depolarization region is preferably 100 nm or less and more preferably 50 nm or less. Moreover, arithmetic mean roughness of the depolarization region of the polarizing plate according to the present invention may be 30 nm or less and more specifically 20 nm or less.

Likewise, in the polarizing plate according to the present invention, root mean square roughness (Rq) of the depolarization region is preferably 100 nm or less and more preferably 50 nm or less. Moreover, root mean square roughness of the depolarization region of the polarizing plate according to the present invention may be 30 nm or less and more specifically 20 nm or less.

In this case, the arithmetic mean roughness (Ra) in the present invention is a value regulated in JIS B0601-1994 and represents a value obtained by sampling a reference length from a roughness curve in a direction of a mean line thereof and summating absolute values of deviations of the sampled portion from the mean line to the measured curve, followed by averaging, and the root mean square roughness (Rq) is regulated in JIS B0601-2001. The arithmetic mean roughness (Ra) and the root mean square roughness (Rq) are measured by the optical profiler (Nanoview E1000, Nano System Inc.).

Generally, if roughness of the polarizer surface is increased, a haze is increased by refraction and reflection of light. Therefore, the present invention exhibits a phenomenon where the haze is reduced due to a reduction in roughness of the surface of the polarizer. In the case where roughness of the depolarization region satisfies the aforementioned range, the haze is sufficiently low, and vivid visibility may be secured. To be more specific, in the depolarization region of the polarizing plate of the present invention, the haze is 3% or less and more preferably 2% or less or 1% or less.

In the polarizer, an area of the depolarization region may be 0.5 $mm^2$ or more and 500 $mm^2$ or less. Specifically, the polarizer according to the present invention is characterized in that the depolarization region is formed by using not the physical removing method but the chemical method, and accordingly, a swelling phenomenon of the polarizer is maximally suppressed to largely improve the surface wrinkles. Moreover, even though the area of the depolarization region of the polarizer according to the present invention is 0.5 $mm^2$ or more and 500 $mm^2$ or less, the surface wrinkles may be controlled not to affect performance. The surface wrinkles may be measured by surface roughness values such as the arithmetic mean roughness (Ra) and the root mean square roughness (Rq). The aforementioned matters can be confirmed through 3D pictures and the surface roughness values of the depolarization regions of the polarizers according to the following Examples and Comparative Examples.

Meanwhile, in the depolarization region, the content of the iodine and/or dichromatic dyes is 0.1 wt % to 0.5 wt % and preferably 0.1 wt % to 0.35 wt %. This is because, as described above, iodine existing in a complex form on the polarizer is washed out by a reaction between the decolorant and iodine, and thus the content of the iodine and/or dichromatic dyes is significantly reduced. In comparison with this, in a region other than the depolarization region, the content of the iodine and/or dichromatic dyes is 1 wt % to 4 wt % and preferably 2 wt % to 4 wt %.

In this case, the content of the iodine and/or dichromatic dyes was measured by using an optical X-ray analytical device (manufactured by Rigaku Electric Co., Ltd., trade name "ZSX Primus II"). In the present invention, average wt % per the volume of 19.2 mm$^3$ was measured by using a polarizer sheet-type sample having a size of 40 mm×40 mm and a thickness of 12 μm.

The depolarization region, as described above, is formed through a step of bringing the polarizer into contact with the decoloring solution. In this case, the content of the iodine and/or dichromatic dyes of the depolarization region is significantly reduced as compared to the other region, and thus transmittance is largely improved.

Meanwhile, the polarizing plate of the present invention as described above may be attached to one surface or both surfaces of a display panel to be usefully applied to an image display. The display panel may be a liquid crystal panel, a plasma panel, and an organic light emitting panel, accordingly, the image display may be a liquid crystal display (LCD), a plasma display panel (PDP), and an organic light emitting diode (OLED).

To be more specific, the image display may be a liquid crystal display including a liquid crystal panel and polarizing plates provided on both surface of the liquid crystal panel, and in this case, at least one of the polarizing plates may be the polarizing plate including the polarizer according to the present invention. That is, the polarizing plate is a polarizing plate including a polyvinyl alcohol-based polarizer dyed with iodine and/or dichromatic dyes, and a protection film laminated on at least one surface of the polyvinyl alcohol-based polarizer, in which the polarizing plate locally has a depolarization region having single transmittance of 80% or more at a wavelength band in a range of 400 nm to 800 nm and arithmetic mean roughness (Ra) of the depolarization region is 100 nm or less.

In this case, a kind of liquid crystal panel included in the liquid crystal display is not particularly limited. For example, all publicly known panels such as a passive matrix-type panel, such as a twisted nematic (TN) type, a super twisted nematic (STN) type, a ferroelectic (F) type, or a polymer dispersed (PD) type; an active matrix-type panel such as a two terminal type or a three terminal type; and an in plane switching (IPS) panel, and a vertical alignment (VA) panel, may be applied, but the kind of liquid crystal panel is not limited thereto. Further, a kind of other constitutions constituting the liquid crystal display, for example, upper and lower substrates (for example, a color filter substrate or an array substrate) and the like, is not particularly limited, and a constitution publicly known in this field may be adopted without a limit.

Meanwhile, the image display of the present invention includes other parts such as a camera module, but is not limited thereto, and the other parts such as the camera module may be positioned in the depolarization region. The camera module may be positioned in the depolarization region where transmittance of the visible-ray region is improved and the polarization degree is decreased, thereby achieving an effect of increasing visibility of a camera lens portion.

Hereinafter, the present invention will be described in more detail through the Examples. The following Examples are set forth to illustrate the present invention, but are not to be construed to limit the present invention.

Example 1

The polyvinyl alcohol-based film having the thickness of 60 μm (Nippon Gohsei Co., Ltd. M3000 grade) was subjected to the swelling process in the pure solution at 25° C. for 15 seconds, and then subjected to the dyeing process in the iodine solution having the concentration of 0.2 wt % at 25° C. for 60 seconds. Thereafter, the polyvinyl alcohol-based film was subjected to the washing process in 1 wt % of the boric acid solution at 45° C. for 30 seconds, and the six times elongation process was then performed in 2.5 wt % of the boric acid solution at 52° C. After elongation, the polyvinyl alcohol-based film was subjected to the complementary color process in 5 wt % of KI solution, and then dried in the oven at 60° C. for 5 minutes to manufacture the polarizer having the thickness of 22 μm.

Thereafter, the acryl-based protection film (thickness 40 μm) was laminated on one surface of the manufactured polarizer by using the cation-based UV adhesive. Then, the decoloring solution (decolorant: KOH 15%) was applied on the surface, on which the acryl-based protection film was not laminated, by using the dispenser. Thereafter, after the time of 35 seconds passed, washing was performed by using acetic acid (Daejung Chemicals & Metals Co., Ltd., 10 wt %, pH 2.4) as the acid solution to manufacture the polarizer including the depolarization region.

Example 2

The polarizing plate including the depolarization region and having the polarizer thickness of 12 μm was manufactured by the same method as Example 1, except that the polyvinyl alcohol-based film (Nippon Gohsei Co., Ltd., M3000 grade) having the thickness of 30 μm was used.

Example 3

The polarizing plate including the depolarization region and having the polarizer thickness of 8 μm was manufactured by the same method as Example 1, except that the polyvinyl alcohol-based film (Nippon Gohsei Co., Ltd., M3000 grade) having the thickness of 20 μm was used.

Comparative Example 1

The polyvinyl alcohol-based film having the thickness of 60 μm (Nippon Gohsei Co., Ltd. M3000 grade) was subjected to the swelling process in the pure solution at 25° C. for 15 seconds, and then subjected to the dyeing process in the iodine solution having the concentration of 0.2 wt % at 25° C. for 60 seconds. Thereafter, the polyvinyl alcohol-based film was subjected to the washing process in 1 wt % of the boric acid solution at 45° C. for 30 seconds, and the six time elongation process was then performed in 2.5 wt % of the boric acid solution at 52° C. After elongation, the polyvinyl alcohol-based film was subjected to the complementary color process in 5 wt % of KI solution, and then dried in the oven at 60° C. for 5 minutes to manufacture the polarizer having the thickness of 22 μm.

The decoloring solution (decolorant: KOH 15%) was applied on one surface of the manufactured polarizer by using the dispenser. Thereafter, after the time of 35 seconds passed, washing was performed by using acetic acid (Daejung Chemicals & Metals Co., Ltd., 10 wt %, pH 2.4) as the acid solution to manufacture the polarizer including the depolarization region.

Comparative Example 2

The polarizer including the depolarization region and having the thickness of 12 μm was manufactured by the same method as Comparative Example 1, except that the polyvinyl alcohol-based film (Nippon Gohsei Co., Ltd., M3000 grade) having the thickness of 30 μm was used.

Comparative Example 3

The polarizer including the depolarization region and having the thickness of 8 μm was manufactured by the same method as Comparative Example 1, except that the polyvinyl alcohol-based film (Nippon Gohsei Co., Ltd., M3000 grade) having the thickness of 20 μm was used.

Reference Example 1

The polyvinyl alcohol-based film having the thickness of 60 μm (Nippon Gohsei Co., Ltd. M3000 grade) was subjected to the swelling process in the pure solution at 25° C. for 15 seconds, and then subjected to the dyeing process in the iodine solution having the concentration of 0.2 wt % at 25° C. for 60 seconds. Thereafter, the polyvinyl alcohol-based film was subjected to the washing process in 1 wt % of the boric acid solution at 45° C. for 30 seconds, and the six times elongation process was then performed in 2.5 wt % of the boric acid solution at 52° C. After elongation, the polyvinyl alcohol-based film was subjected to the complementary color process in 5 wt % of KI solution, and then dried in the oven at 60° C. for 5 minutes to manufacture the polarizer not including the depolarization region and having the thickness of 22 μm.

Reference Example 2

The polarizer having the thickness of 12 μm was manufactured by the same method as Reference Example 1, except that the polyvinyl alcohol-based film (Nippon Gohsei Co., Ltd., M3000 grade) having the thickness of 30 μm was used.

Reference Example 3

The polarizer having the thickness of 8 μm was manufactured by the same method as Reference Example 1, except that the polyvinyl alcohol-based film (Nippon Gohsei Co., Ltd., M3000 grade) having the thickness of 20 μm was used.

Experimental Example 1—Evaluation of Optical Properties of Depolarization Region The polarizing plates manufactured by Examples 1 to 3 and the polarizers manufactured by Comparative Examples 1 to 3 were cut to have the size of 40 mm×40 mm, the specimen was fixed to the measurement holder, and initial optical properties of the depolarization region, that is, single transmittance and the polarization degree were measured by using the UV-VIS spectrometer (V-7100, manufactured by JASCO Corp.). Meanwhile, initial optical properties of the polarizers not having the depolarization region, which were manufactured by Reference Examples 1 to 3, were also measured. Particularly, the values at 550 nm are described in Table 1.

Experimental Example 2—Measurement of Surface Roughness

In the polarizing plates manufactured by Examples 1 to 3 and the polarizers manufactured by Comparative Examples 1 to 3, surface roughnesses of the depolarization regions having the same size were measured by using the optical profiler (Nanoview E1000, Nano System Inc.) and the 20 magnification lens. Meanwhile, surface roughnesses of the polarizers not having the depolarization region, which were manufactured by Reference Examples 1 to 3, were measured. The result values are described in Table 1.

Experimental Example 3—Measurement of Haze

In the polarizing plates manufactured by Examples 1 to 3 and the polarizers manufactured by Comparative Examples 1 to 3, hazes of the depolarization regions having the same size were measured by using the haze meter (NDH 500SP, NIPPON DENSHOKU INDUSTRIES). Meanwhile, the hazes of the polarizers not having the depolarization region, which were manufactured by Reference Examples 1 to 3, were measured. The result values are described in Table 1.

TABLE 1

| Classification | Thickness of polarizer (μm) | Single transmittance (%) | Polarization degree (%) | Haze (%) | Arithmetic mean roughness (Ra) (nm) | Root mean square roughness (Rq) (nm) |
|---|---|---|---|---|---|---|
| Example 1 | 22 | 92.44 | 0.12 | 0.3 | 15 | 18 |
| Example 2 | 12 | 92.35 | 0.19 | 0.3 | 8 | 11 |
| Example 3 | 8 | 92.38 | 0.11 | 0.3 | 3 | 4 |
| Comparative Example 1 | 22 | 92.31 | 0.13 | 3.6 | 270 | 340 |
| Comparative Example 2 | 12 | 92.29 | 0.19 | 3.1 | 280 | 360 |
| Comparative Example 3 | 8 | 92.41 | 0.12 | 3.2 | 270 | 340 |
| Reference Example 1 | 22 | 42.5 | 99.99 | 0.3 | 13 | 17 |
| Reference Example 2 | 12 | 42.5 | 99.99 | 0.3 | 5 | 9 |
| Reference Example 3 | 8 | 42.5 | 99.99 | 0.3 | 2 | 3 |

Reviewing Examples 1 to 3 and Comparative Examples 1 to 3 of Table 1, it could be confirmed that when depolarization was performed by using the decoloring solution, in the case where the protection film was first laminated on one surface of the polarizer, the surface roughness and the haze of the depolarization region were significantly small.

Figure 1:
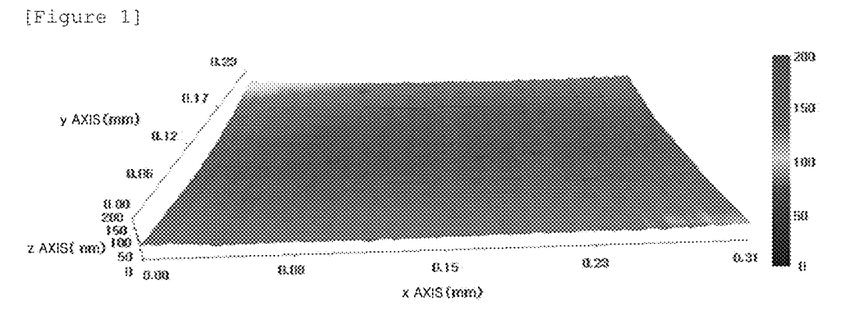
FIG. 1 is a 3D picture obtained by photographing a surface of a depolarization region in a polarizing plate of Example 1 by using a white light three dimension measuring machine (optical profiler).
Figure 2:
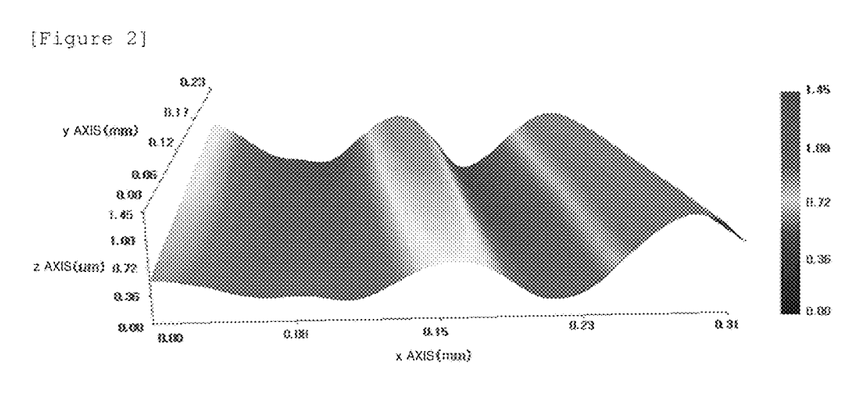
FIG. 2 is a 3D picture obtained by photographing a surface of a depolarization region in a polarizer of Comparative Example 1 by using a white light three dimension measuring machine (optical profiler).

Further, reviewing FIG. 1 where the polarizing plate of the following Example 1 was photographed, in the 3D picture of the depolarization region, it could be confirmed that the surface was very flat and surface roughness was uniform, but reviewing FIG. 2 where the polarizer of Comparative Example 1 was photographed, it could be confirmed that the wrinkles were formed on the surface of the depolarization region.

Meanwhile, reviewing Examples 1 to 3 and Reference Examples 1 to 3 of Table 1, it could be confirmed that through the decoloring step, in the depolarization region, single transmittance was largely improved to 92% or more and the polarization degree was reduced to 0.1% or less, and thus depolarization was implemented. Further, it could be confirmed that like Examples 1 to 3, in the case where the decoloring process was performed by forming the protection film on one surface, there was no large difference as compared to roughness of the region which was not decolored.

Although the exemplary embodiments of the present invention are described in detail, the scope of the present invention is not limited to the exemplary embodiments, and it will be apparent to those skilled in the art that various modifications and changes may be made thereto without departing from the technical spirit of the present invention described in the claims.

The invention claimed is:

1. A method for manufacturing a polarizing plate, the method comprising:
   preparing a polarizing plate where a protection film is laminated on one surface of a polyvinyl alcohol-based polarizer dyed with at least one or more of iodine and dichromatic dyes;
   forming at least one depolarization region having single transmittance of 80% or more at a wavelength band in a range of 400 nm to 800 nm and arithmetic mean roughness (Ra) of 100 nm or less, by bringing a decoloring solution including 1 to 30 wt % of a decolorant into local contact with the other surface of the polarizer; and
   performing washing by using an acid solution,
   wherein the forming of the depolarization region is performed by a dispenser, inkjet, or gravure printing method.

2. The method of claim 1, wherein the decolorant includes one kind or more selected from the group consisting of sodium hydroxide (NaOH), sodium hydrosulfide (NaSH), sodium azide (NaN$_3$), potassium hydroxide (KOH), potassium hydrosulfide (KSH), and potassium thiosulfate (KS$_2$O$_3$).

3. The method of claim 1, wherein a pH of the decoloring solution is 11 to 14.

4. The method of claim 1, wherein a viscosity of the decoloring solution is 1 cP to 2000 cP.

5. The method of claim 1, wherein the decoloring solution further includes a viscosity agent.

6. The method of claim 5, wherein the viscosity agent includes one kind or more selected from the group consisting of a polyvinyl alcohol-based resin, a polyvinyl acetoacetate-based resin, an acetoacetyl group-denatured polyvinyl alcohol-based resin, butenediolvinyl alcohols, a polyethylene glycol-based resin, and a polyacrylamide-based resin.

7. The method of claim 1, wherein the decoloring solution includes: 1 wt % to 30 wt % of a decolorant; 0.5 wt % to 30 wt % of the viscosity agent; and water as a balance, based on a total weight.

8. The method of claim 1, wherein an area of at least one depolarization region is 0.5 mm$^2$ or more and 500 mm$^2$ or less.

9. The method of claim 1, further comprising:
   after the forming of the depolarization region, forming an optical layer on at least one surface of the polarizing plate.

10. The method of claim 9, wherein the optical layer includes a protection film, a retardation film, a luminance improvement film, a hard coating layer, an antireflection layer, a cohesive layer, an adhesion layer, or a local decoloring region which is a combination thereof.

11. A polarizing plate comprising:
    a polyvinyl alcohol-based polarizer dyed with at least one or more of iodine and dichromatic dyes, and
    an acryl-based protection film laminated on at least one surface of the polyvinyl alcohol-based polarizer by using a cation-based UV adhesive,
    wherein the polarizing plate locally has at least one depolarization region having single transmittance of 80% or more at a wavelength band in a range of 400 nm to 800 nm, and arithmetic mean roughness (Ra) of the depolarization region is 100 nm or less.

12. The polarizing plate of claim 11, wherein root mean square roughness (Rq) of the depolarization region is 100 nm or less.

13. The polarizing plate of claim 11, wherein an area of at least one depolarization region is 0.5 mm2 or more and 500 mm2 or less.

14. The polarizing plate of claim 11, wherein in the depolarization region of the polarizing plate, a polarization degree is 20% or less.

15. The polarizing plate of claim 11, wherein in a region of the polarizing plate other than the depolarization region, the single transmittance is 40% to 45% and a polarization degree is 99% or more.

16. The polarizing plate of claim 11, wherein in the depolarization region of the polarizing plate, a haze is 3% or less.

17. The polarizing plate of claim 11, wherein in the depolarization region, a content of at least one or more of the iodine and dichromatic dyes is 0.1 wt % to 0.5 wt %, and in a region other than the depolarization region, the content of at least one or more of the iodine and dichromatic dyes is 1 wt % to 4 wt %.

* * * * *